United States Patent [19]

Keme et al.

[11] Patent Number: 4,980,189

[45] Date of Patent: Dec. 25, 1990

[54] PROCESS FOR THE MANUFACTURE OF SUCROSE-FREE, DIETETIC AND/OR TEETH-SPARING CHOCOLATE

[75] Inventors: Thomas Keme, Aarau, Switzerland; Hartmut Bollinger, Ludwigshafen, Fed. Rep. of Germany

[73] Assignee: Suddeutsche Zucker-Aktiengesellschaft, Mannheim, Fed. Rep. of Germany

[21] Appl. No.: 274,560

[22] Filed: Nov. 22, 1988

[30] Foreign Application Priority Data

Nov. 25, 1987 [DE] Fed. Rep. of Germany ....... 3739999

[51] Int. Cl.$^5$ .................................................. A23G 1/00
[52] U.S. Cl. ................................ 426/548; 426/593; 426/631; 426/659; 426/660
[58] Field of Search ............... 426/548, 658, 659, 100, 426/101, 306, 95, 570, 98, 99, 103, 138, 139, 660, 661, 631, 593

[56] References Cited

U.S. PATENT DOCUMENTS

| | | | |
|---|---|---|---|
| 2,876,104 | 3/1959 | Bliudzius | 426/660 |
| 2,876,106 | 3/1959 | Jucaitis | 426/660 |
| 3,876,794 | 4/1975 | Rennhard | 426/593 |
| 4,011,349 | 3/1977 | Riesen | 426/631 |
| 4,084,011 | 4/1978 | Chevalley | 426/631 |
| 4,134,999 | 1/1979 | Muhler | 426/660 |
| 4,518,581 | 5/1985 | Miyake | 426/660 |
| 4,622,233 | 11/1986 | Torres | 426/660 |
| 4,701,337 | 10/1987 | Frost | 426/660 |

FOREIGN PATENT DOCUMENTS

| | | | |
|---|---|---|---|
| 948022 | 5/1974 | Canada | 426/660 |
| 0285187 | 10/1988 | European Pat. Off. | 426/631 |
| 60-94058 | 5/1985 | Japan | 426/631 |
| 60-102144 | 6/1985 | Japan | 426/631 |
| 208810 | 6/1985 | Japan . | |
| 80-01869 | 9/1980 | PCT Int'l Appl. | 426/660 |

OTHER PUBLICATIONS

Polydextrose, 1983, Pfizer Chemical Division, New York.
Minifie, 1980, Chocolate, Cocoa and Confectionary, AVI Publishing Co. Inc., Westport, Conn., p. 40.
Ullmans Encyklopadie det Technischen Chemie, p. 673.
Weidenhagen & Lorenz Agnew Chem, 1957.
British Pharmacopeia Commission.

Primary Examiner—Carolyn Paden
Attorney, Agent, or Firm—Armstrong, Nikaido, Marmelstein, Kubovcik & Murray

[57] ABSTRACT

There is disclosed a process for the manufacture of sugar-free dietetic and/or teeth-sparing chocolates with the preceding separate production of a sugar-free crumb and its further processing with its use of the chocolate constituents otherwise usual and subsequent tumbling into chocolate.

11 Claims, No Drawings

PROCESS FOR THE MANUFACTURE OF SUCROSE-FREE, DIETETIC AND/OR TEETH-SPARING CHOCOLATE

BACKGROUND OF THE INVENTION

This invention relates to a process for the manufacture of Sucrose-free, dietetic and/or teeth-sparing chocolate.

As sucrose substitutes, sugar alcohols for example can be used, such as sorbitol, mannitol, maltitol, lactitol, xylitol, "PALATINIT", i.e., isomalt etc., or also the teeth-sparing disaccharide "PALATINOSE", i.e., isomaltose leucrose and polydextrose, as well as mixtures thereof. These sucrose substitutes are combined with milk products such as unsweetened evaporated milk, whole-milk powder, skimmed-milk powder or milk product derivatives (free of lactose or containing lactose) with or without the addition of chocolate liquor containing up to 50% native cocoa butter, cocoa powder, cocoa butter or milk fat, if desired with the further addition of other substances such as emulsifiers (e.g. lecithin, PGPR, and ammonium salt of phosphatide acid (YN)), flavorings (vanilla etc.), sweeteners (cyclamate, saccharin, etc.).

Indeed, diabetic chocolate or teeth-sparing chocolate has already been manufactured by direct preparation from milk products, chocolate liquor containing up to 50% native cocoa butter and cocoa butter, with the use of sucrose substitutes. However, in its manufacture (rolling and tumbling) formation of agglomerates became apparent. These agglomerates form at the beginning of or during the tumbling process with the result that the end product has a gritty coarse texture. As was found, the cause lies, among other things, in the hygroscopic capacity of these products, namely their property of absorbing water. On the one hand, in the manufacture of the chocolate, water is absorbed from the air during the process and on the other hand, water comes into the product with the added raw substances such as milk powder, special milk product, chocolate liquor containing up to 50% native cocoa butter etc.; however, the water supplier can be the added sucrose substitute itself, for example when it has a large water content itself or if water is combined with it in the form of water of crystallization.

At the same time, the water content of the substance or the hygroscopic capacity upsets the fragmentation process (the rolling) considerably, with the result that even during the rolling, the desired refinements often can not be attained.

With certain sucrose substitutes (in the form supplied today) the technological reaction to the 5-rolling mills is also inadequate. The fluctuations in production and the inhomogeneity of the substance have a disadvantageous effect on the quality of the end product.

The crumb process serves as another basis for the production of chocolate. This process yields a distinctive chocolate flavour (attractive, caramel milk flavour, mild cocoa grades) and in addition to this, it brings about economic advantages (good storage stability, possible saving in tumbling time). Known crumb systems include, among others: Scott-Balfour system, crumb process according to Dr. Powell/Cadbury, Groen process. However, it is disadvantageous that one cannot employ all of the known crumb systems starting with products for the manufacture of sucrose-free, dietetic and/or teethsparing chocolates.

A further disadvantage of the sucrose substitutes employed in present-day form is the organoleptic properties of the diabetic and teeth-sparing milk chocolates. The reason lies in the observance of the low tumbling temperature (40° to 50° C.) made necessary by the physical properties (low melting point and/or water of crystalization) of the sucrose substitutes. The most important functions of the conche are degasification and mechanical-thermal treatment. It is known that during the tumbling, taste components can form by means of reactions between amino acids, reducing sugars, as well as other primary flavouring stages (taste-giving substances) of the chocolate liquor containing up to 50% native cocoa butter and milk constituents. In this connection the speed of the reaction, among other things, is dependent on the temperature. A refinement in taste obviously accompanies the improvement in consistency as a result of the tumbling. Another purpose of the tumbling is the removal of the water and other steam-volatile substances from the chocolate mass. In this process the steam also takes on the function of a means of transportation, namely a portion of the undesired taste components is removed from the chocolate mass by means of steam. This process is also dependent on temperature, time and consistency.

If the chocolate mass has too high a viscosity, the lateral forces are so great that during the tumbling, the temperatures cause the crystal surfaces of the sucrose substitutes to melt and agglomerates can form as a result.

Another explanation of this formation of agglomerates, which is more probable, is the following. The tumbling temperature (40° to 50° C.) of the chocolate mass has the effect that, during the tumbling process (6 to 24 hours), quantitatively more sucrose substitutes accumulate (dissolve) in the water, even if present in a small amount. The crystal surfaces are etched and thereby cause agglomeration of the sucrose substitute particles, at the same time as water loss. A portion of the sucrose substitutes crystallizes again or recrystallizes from this oversaturated solution. This leads to a growth of the sucrose substitute crystals already present and, on the other hand, to a change in the crystal structure.

Important factors in the formation of agglomerates are the chemical purity of the sucrose substitute used, the crystal shape (stable, unstable) and crystal structure thereof, the presence of water of crystallization, its solubility in water and the hygroscopic capacity.

The taste and the sweetness of chocolates can be substantially determined by the choice of the sucrose substitutes used. In the consumption of products which contain monosaccharide alcohol, the consumer experiences a cooling effect in the mouth caused by the differing solution enthalpy of the individual saccharides. The sugar alcohols xylitol, mannitol and sorbitol have high negative heats of solution and thereby give a non-typical taste. However, the consumer demands a taste impression which is similar to saccharose, that is to say, the sucrose alcohols (monosaccharides) mentioned above are less suitable for use in chocolates.

SUMMARY OF THE INVENTION

Accordingly, the basic object of the invention is to counter the above-mentioned properties of the sucrose substitutes which have a negative effect on the end product, with suitable processes or by effecting these processes on the sucrose substitute intermediate products (diabetic crumb) and the manufacture of chocolate, so that with regard to the tendency towards agglomerate formation and with regard to the fineness of the end product, products are obtained which are essentially improved.

Moreover, the process underlying the invention should make available a taste profile (similar to sucrose) typical for chocolates, in conjunction with a good texture and a full body.

Moreover, the specific intermediate product requirements for the tumbling should be improved to the effect that they have an increased sorption capacity for the cocoa flavour.

The object of the invention is achieved by (a) mixing a solid sucrose substitute selected from the group consisting of sugar alcohols, isomaltulose, isomalt, lucrose and a polydextrose and mixtures thereof with a liquid or solid milk product selected from the group consisting of unsweetened evaporated milk, whole milk powder, and skimmed milk powder;

(b) heating the mixture;

(c) adding chocolate liquor containing up to 50% native cocoa butter to the heated mixture;

(d) drying the mixture in a vacuum until a powdery crumb product is obtained, containing on a dry basis 30 to 80% by weight of the sucrose substitute, 10 to 60% by weight of the milk product and up to 35% by weight of the chocolate liquor containing up to 50% native cocoa butter, and having a water content of 1.3%, not including water of crystallization of the sucrose substitute;

(e) sorting the dry crumb product to obtain particles having a diameter of less than 3000 microns;

(f) rolling the sorted particles having a diameter of less than 3000 microns to produce a chocolate mass;

(g) placing the rolled chocolate mass and additional cocoa butter into a conche; and (h) tumbling the chocolate mass and additional cocoa butter at temperatures of up to 85° C., to produce a sucrose-free chocolate and mixing it with flavoring.

It is possible to include in step (g) the addition of an emulsifier with the additional cocoa butter. Optionally, the emulsifier may be added in step (h).

DESCRIPTION OF THE PREFERRED EMBODIMENTS

The invention is further developed by the characterizing features of the subclaims.

The mixture which is put into a kneading machine comprises a dry matter content of 70 to 99% by weight according to the present invention.

To attain the desired taste profile of the chocolate product, as well as for reasons of technological workability, texture-giving disaccharide alcohols are used such as the product sold under trademark "PALATINIT", maltitol, lactitol, the product sold under the trademark "PALATINOSE" and leucrose, as well as polydextrose, or mixtures thereof, are used.

The substances which are necessary for the formation of the crumb are therefore employed in such quantities that, after its manufacture, those percentage portions which are given above (on a dry basis) are present. In this connection it is advantageous that, according to the invention, the resulting crumb product has a water content which is less than 1.3% (not including water of crystallization of the sucrose substitute). Preferably, the portion of sucrose substitutes is 45 to 60% by weight, that of the milk products is 30 to 45% by weight and that of the chocolate liquor containing up to 50% native cocoa butter is 0 to 15% by weight.

If the sucrose-free crumb product (which is not sealed hermetically) is interstratified or layered prior to subsequent treatment, it will absorb water more or less rapidly depending on the prevailing interstratifying or layering conditions. In that case, the crumb product can have a water content reaching up to 5.2%; usually, the water content is between 1.0 and 3.5%. However, during further processing of the interstratified or layered crumb product into chocolate, the high water content does not have a negative effect.

As a substitute for the chocolate liquor containing up to 50% native cocoa butter, cocoa powder can also be used, with or without the addition of cocoa butter.

Moreover, by the crumb process according to the invention, an improvement of the physical consistency of the crumb product is attained. However, there is also a causal connection with the change in flavour, that is to say, a refinement of the taste accompanies the improvement in consistency.

Moreover, it is advantageous that the sucrose substitutes in the crumb powder crystallize very finely during rapid cooling-down. Hence, they have a large specific surface area and in this way an increased sorption reaction for the cocoa flavour is attained. In this way, the typical taste profile of chocolate is attained.

The following examples illustrate the invention in greater detail.

EXAMPLE 1

(Diabetic milk-crumb)

| The following are employed: | Parts by weight | Water content Parts by weight |
|---|---|---|
| 1. The sucrose substitute "PALATINIT" | 58.3 | 2.90 |
| 2. Evaporated milk, unsweetened, 8.2% fat | 14.8 | 10.00 |
| 3. Whole-milk powder, 25% fat | 33.2 | 1.16 |
| 4. Chocolate liquor containing up to 50% native cocoa butter | 6.6 | 0.10 |
| | 112.9 | 14.16 |

| Composition of the unsweetened evaporated milk | | Dry Basis |
|---|---|---|
| Water | 67.6% | — |
| Fat content | 8.2% | 25.3% |
| Lactose | 12.3% | 38.0% |
| Protein | 9.9% | 30.5% |
| Ash | 2.0% | 6.2% |
| | 100.0% | 100.0% |

Crumb manufacture

The sucrose substitute "PALATINIT", unsweetened evaporated milk and whole-milk powder are put into a vacuum kneading machine and are heated to 94° C. The chocolate liquor containing up to 50% native cocoa butter is added and the mixture is dried in a vacuum of $-7.8 \times 10^4$ to $9.3 \times 10^4$ Pa, until a powdery product with a water content of 1% is obtained. After cooling down to about 20° C., the product is passed through a mesh with a mesh aperture of 2 mm. After bags have been filled with it, it can forthwith be further used for the manufacture of milk chocolate. The composition of the diabetic milk-crumb on a dry basis is as follows:

| | |
|---|---|
| The sucrose substitute "PALATINIT" | 56.0% |
| Milk constituents (calculated from whole-milk powder, 25% fat) | 37.4% |
| Chocolate liquor containing up to 50% native cocoa butter | 6.6% |

The water content is about 0.6% and the fat content 13.0% (not including the water of crystallization of the sucrose substitute).

| Chocolate Recipe | |
|---|---|
| 1. Diabetic milk-crumb (as above) | 70.33% |
| 2. Chocolate liquor containing up to 50% native cocoa butter | 6.60% |
| 3. Cocoa butter | 22.30% |
| 4. Lecithin | 0.48% |
| 5. Saccharin-Na | 0.03% |
| 6. Cyclamate-Na | 0.24% |
| 7. Vanilla | 0.02% |
| | 100.00% |

The above diabetic milk-crumb is mixed with the chocolate liquor containing up to 50% native cocoa butter, the saccharin, the cyclamate and a portion of the cocoa butter. The mixture is rolled (with or without roughing-down or breaking-down) and is then poured into the conche with the remaining cocoa butter and submitted to a tumbling, the tumbling temperature being 67° to 71° C. Hence, in contrast with the otherwise usual tumbling temperature it can be higher than 40° to 50° C. The tumbling time is usually 12-24 hours. With the use of newer installations, however, it can also be shortened by up to about 1 hour. After the addition of the lecithin and flavouring, a chocolate is obtained which has the following analytical characteristics:

| | |
|---|---|
| Water content: | 0.5–0.8% (compartment drier 102 ± 2° C., 3.5 hours) |
| Retained on a 20 micron-mesh screen | 48% on a fat-free dry basis |
| Fat content: | 35.0–35.5% |
| Viscosity 40° C.: | about 4400 mPa · s |

With regard to taste this chocolate has a light caramel taste and compared with diabetic chocolate manufactured according to a conventional process, it is clearly superior in all respects.

EXAMPLE 2

(Teeth-sparing milk-crumb)

| The following are employed: | Parts by weight | water content Parts by weight |
|---|---|---|
| The sugar substitute "PALATINIT" | 58.3 | 2.90 |
| 2. Milk powder, special, low in lactose, 25% fat | 38.0 | 1.33 |
| 3. Water | 10.0 | 10.00 |
| 4. Chocolate liquor containing up to 50% native cocoa butter | 6.6 | 0.10 |
| | 112.9 | 14.33 |

The manufacture of crumb, as well as the further processing into milk chocolate, are identical with Example 1.

EXAMPLE 3

(Diabetic milk-crumb)

| The following are employed: | Parts by weight | Water content Parts by weight |
|---|---|---|
| 1. Maltitol, crystalline | 53.7 | — |
| 2. Whole-milk powder, 25% fat | 37.1 | 1.3 |
| 3. Water | 11.5 | 11.5 |
| 4. Chocolate liquor containing up to 50% native cocoa butter | 6.5 | 0.1 |
| | 108.7 | 12.9 |

The manufacture of crumb is effected according to Example 1. The composition of crumb is identical with Example 1.

The water and the fat content are about 1.0% and 13.0%, respectively.

Manufacture of chocolate

With regard to the sweetening power of maltitol, the recipe is identical with Example 1, i.e. it is possible to reduce or replace saccharin-Na and cyclamate-Na by acesulfame-K with regard to the sweetening power of the sweeteners.

The manufacture is effected according to Example 1.

EXAMPLE 4

(Teeth-sparing milk-crumb)

| The following are employed: | Parts by weight | Water content Parts by weight |
|---|---|---|
| 1. The sucrose substitute "PALATINOSE" | 55.4 | — |
| 2. Milk powder, special, low in lactose, 25% fat | 38.0 | 1.33 |
| 3. Water | 19.0 | 19.00 |
| 4. Chocolate liquor containing up to 50% native cocoa butter | 6.6 | 0.10 |
| | 119.0 | 20.43 |

The manufacture of crumb as well as the further processing into milk chocolate are identical with Example 1.

EXAMPLE 5

(Diabetic milk-crumb)

| The following are employed: | Parts by weight | Water content Parts by weight |
|---|---|---|
| 1. Lactitol, dihydrate | 61.5 | 6.15 |
| 2. Whole-milk powder, 25% fat | 38.0 | 1.33 |
| 3. Water | 6.8 | 6.80 |
| 4. Chocolate liquor containing up to 50% native cocoa butter | 6.6 | 0.10 |
| | 112.6 | 14.38 |

The manufacture of crumb is effected according to Example 1. The composition of crumb is identical with Example 1.

The water and the fat contents are about 1.0% and 13.0%, respectively (not including the water of crystallization of the sucrose substitute).

Manufacture of chocolate

With regard to the sweetening power of lactitol, the recipe is identical with Example 1, i.e. saccharin-Na and cyclamate-Na have to be increased or replaced by ace-sulfame-K in consideration of the sweetening power of the sweeteners.

The manufacture is effected according to Example 1.

The method for analyzing the water content (compartment-drier-method) provides identical values as they are obtained according to the method L 44.00 published in the official digest of analyzing methods in compliance with § 35 LMBG, Beuth-Verlag, Berlin-Köln, Dec. 1985.

Using the Karl-Fischer-Method, for example, one can obtain slightly lower values of the water content when analyzing the chocolate at 50° C. in a mixture of "Hydranal" solvent (Registered Trade Mark) and chloroform (2:1, v/v).

We claim:

1. A process for manufacture of sucrose-free chocolate by first preparing a sucrose-free chocolate crumb and second tumbling the sucrose-free chocolate crumb with additional cocoa butter in a conche comprising the steps of:
   (a) mixing a solid sucrose substitute selected from the group consisting of sugar alcohols, isomaltulose, isomalt, leucrose and polydextrose and mixtures thereof with a liquid or solid milk product selected from the group consisting of unsweetened evaporated milk, whole milk powder, and skimmed milk powder;
   (b) heating the mixture;
   (c) adding chocolate liquor containing up to 50% native cocoa butter to the heated mixture;
   (d) drying the mixture in a vacuum until a powdery crumb product is obtained containing on a dry basis 30 to 80% by weight of the sucrose substitute, 10 to 60% by weight of the milk product and up to 35% by weight of the chocolate liquor containing up to 50% native cocoa butter, and having a water content of 1.3%, not including water of crystallization of the sucrose substitute;
   (e) sorting the dried crumb product to obtain particles having a diameter of less than 3000 microns;
   (f) rolling the sorted particles having a diameter of less than 3000 microns to produce a chocolate mass;
   (g) placing the rolled chocolate mass and additional cocoa butter into a conche;
   (h) tumbling the chocolate mass and additional cocoa butter at temperatures of up to 85° C., to produce said sucrose-free chocolate and mixing it with flavoring.

2. Process according to claim 1, wherein in step (a) a vacuum kneading machine, is used.

3. Process according to claim 2, wherein the mixture put into the vacuum kneading machine is heated to 50° to 140° C.

4. Process according to claim 1 or 3, wherein the chocolate liquor containing 50% native cocoa butter is added to a vacuum kneading machine, with the heated mixture in step (d) and is dried in a vacuum of $-4 \times 10^4$ to $10^5$ Pa.

5. Process according to claim 1, wherein in step (f) the crumb product is rolled with a composition selected from the group consisting of a hazelnut paste, almond paste cocoa butter and mixtures thereof.

6. The process according to claim 1 further comprising interstratifying the crumb product after step (d) and prior to step (e).

7. The process according to claim 1 further comprising roughing-down the crumb-product after step (e) and prior to step (f).

8. The process according to claim 1 further comprising at step (f) adding ingredients selected from the group consisting of chocolate liquor containing up to 50% cocoa butter, emulsifiers, flavor ingredients and sweeteners and mixtures thereof.

9. The process according to claim 1 or 8 which comprises conducting tumbling at step (h) at 55° to 75° C.

10. The process according to claim 9 further comprising tumbling the chocolate mass of step (h) with added cocoa butter and ingredients selected from the group consisting of flavoring agents, emulsifiers and sweeteners.

11. A process for manufacturing a sucrose-free, intermediate crumb product for the production of sucrose-free chocolate products comprising:
   (a) mixing a solid sucrose substitute selected from the group consisting of sugar alcohols, isomaltulose, isomalt, leucrose and polydextrose and mixtures thereof with a liquid or solid milk product selected from the group consisting of unsweetened evaporated milk, whole milk powder, and skimmed milk powder;
   (b) heating the mixture;
   (c) adding chocolate liquor containing up to 50% native cocoa butter to the heated mixture;
   (d) drying the mixture in a vacuum until a powdery crumb product is obtained containing on a dry basis 30 to 80% by weight of the sucrose substitute, 10 to 60% by weight of the milk product and up to 35% by weight of the chocolate liquor containing up to 50% native cocoa butter, and having a water content of 1.3%, not including water of crystallization of the sucrose substitute.

* * * * *